MULTICHANNEL RADIO COMMUNICATION SYSTEM

Filed March 17, 1950 3 Sheets-Sheet 1

Inventor
WILLIAM G. ALEXANDER
CHARLES McL. HARDEN

By Killman and Kerst
Attorney

Inventor
WILLIAM G. ALEXANDER
CHARLES McL. HARDEN

By Killman and Kerst
Attorney

Inventor
WILLIAM G. ALEXANDER
CHARLES McL. HARDEN

By Killman and Kerst
Attorney

Patented Sept. 15, 1953 2,652,453

UNITED STATES PATENT OFFICE 2,652,453

MULTICHANNEL RADIO COMMUNICATION SYSTEM

William G. Alexander, Baltimore, and Charles McL. Harden, Towson, Md., assignors to Bendix Aviation Corporation, Towson, Md., a corporation of Delaware Application March 17, 1950, Serial No. 150,284

3 Claims. (Cl. 179—15)

Figure 1:
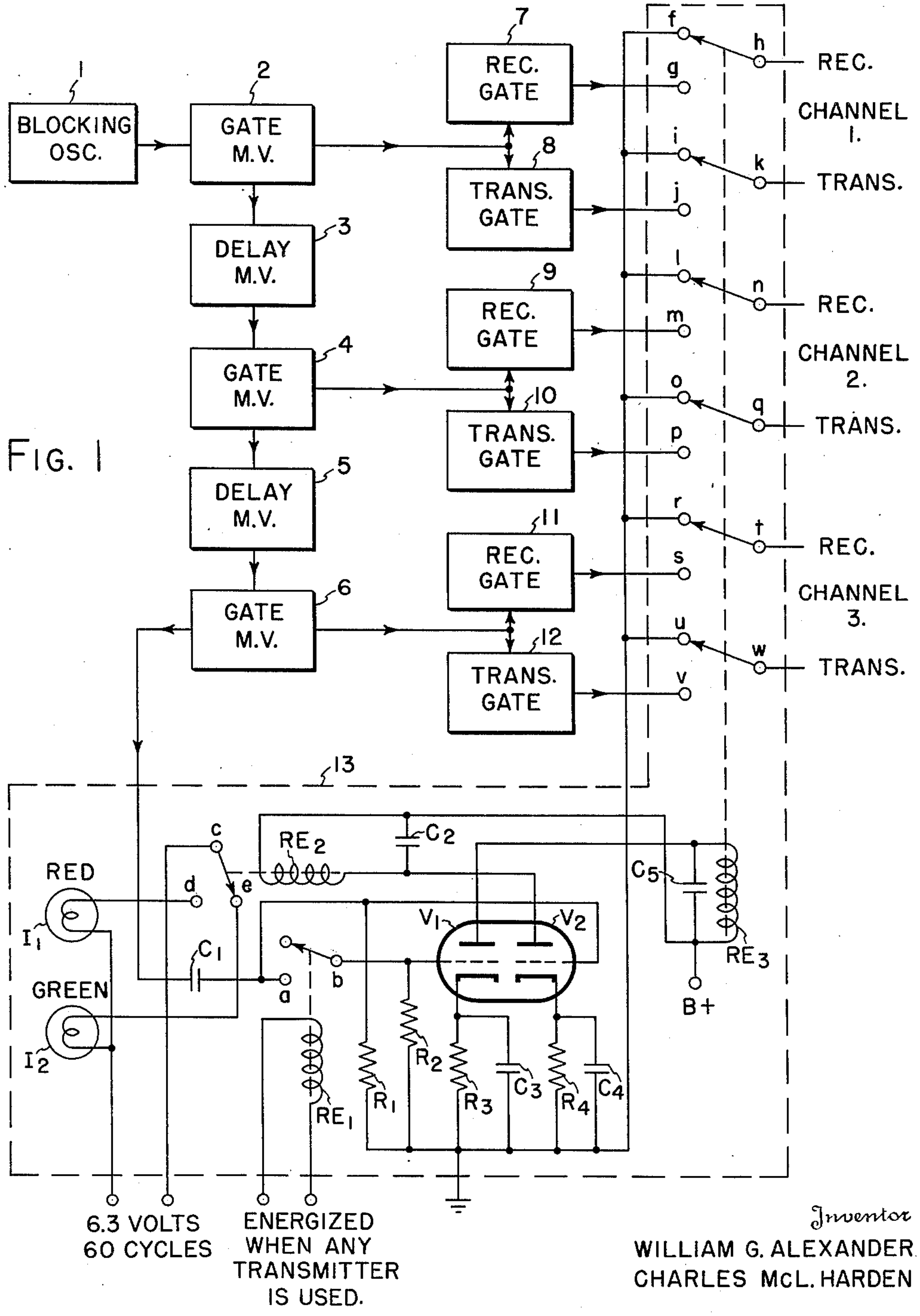

This invention relates to multiple channel radio communication systems and more specifically to a system of time sharing for two or more communication channels.

The necessity for such an invention results from a serious cross-talk problem encountered between two or more communication channels in the VHF (very high frequency) band. The difficulty arises from the fact that when one transmitter is in operation it is nearly impossible for a nearby receiver, which is tuned to an adjacent frequency channel, to receive a distant station because of cross-talk from the transmitter. Various arrangements of antenna placement and location were tried without success. In fact with the antennas spaced as much as a mile apart, cross-talk was still present. Band-pass and band-elimination filters were also used with little success. In the past, operation has been limited to one channel at a time to prevent this cross-talk.

An object of this invention is to provide a means for the elimination of cross-talk between two or more radio communication channels in close physical proximity and on adjacent frequency channels, said means comprising a commutating device to sequentially key the communication channels in rotation at a frequency higher than may be heard by the human ear.

Another object of this invention is to key, at a high frequency, either the transmitter or receiver in the communication channel, whichever may be in use at the time, thereby placing no limits on transmission or reception in the individual channels.

Another object of this invention is to provide normal, non-interrupted reception when no transmitter is in operation, but to put all channels on a time sharing basis when one or more channels are transmitting.

Another object is to devise a low cost time sharing system which may be used in conjunction with standard communication equipment with very slight modifications to said equipment.

Another object of this invention is to provide a fail-safe circuit to permit normal, non-interrupted operation of both the transmitter and receiver in all channels in case of failure of the commutating device.

Another object of this invention is to provide visual indication as to whether or not the commutating device is functioning properly.

The particular embodiment described here was used in conjunction with GCA (ground controlled approach or talk-down) aircraft landing equipment although it may be used for any mobile station such as a ship or airplane or any ground station where it is necessary to have two or more communication channels on adjacent frequency channels and in close physical proximity.

In the GCA equipment the range, azimuth and elevation data for the airplane are picked up by precision radar equipment. This information is relayed to the pilot of the airplane by a VHF (118–156 megacycles) voice communication link. As many as three airplanes may, at any time, be handled in various stages of landing. Each airplane requires a separate communication link so that three channels are required for relaying information to these airplanes.

In the specific embodiment of the invention described here, the commutating device consists of a chain of one-kick multivibrators. Other types of commutating devices may be used, such as mechanical commutators, cathode ray tube commutators, delay lines of various types and a chain of blocking oscillators. Such devices are well known in the prior art and will be given little attention here.

It is well known that any intelligence representing a continuous function of time may be transmitted without distortion, without the necessity of transmitting the function in its entirety. The conventional method is to transmit only a discontinuous function of time, composed of discrete samples of the continuous function. If the samples are taken at a rate higher than the highest audio frequency transmitted, the original function may be reconstructed from these samples. A sampling rate of two and one-half times per cycle of the highest modulating frequency transmitted yields a signal-to-noise ratio of forty-to-one. As an example, an audio system having a low-pass filter in the audio circuit with a cut-off frequency of three thousand cycles would have a sampling rate of seven thousand five hundred cycles. This sampling is still in the audible range and would be heard in aircraft without a low-pass filter. A sampling rate of ten thousand cycles is used for illustration here, but this frequency may vary from five thousand to twenty thousand cycles.

Figure 2:
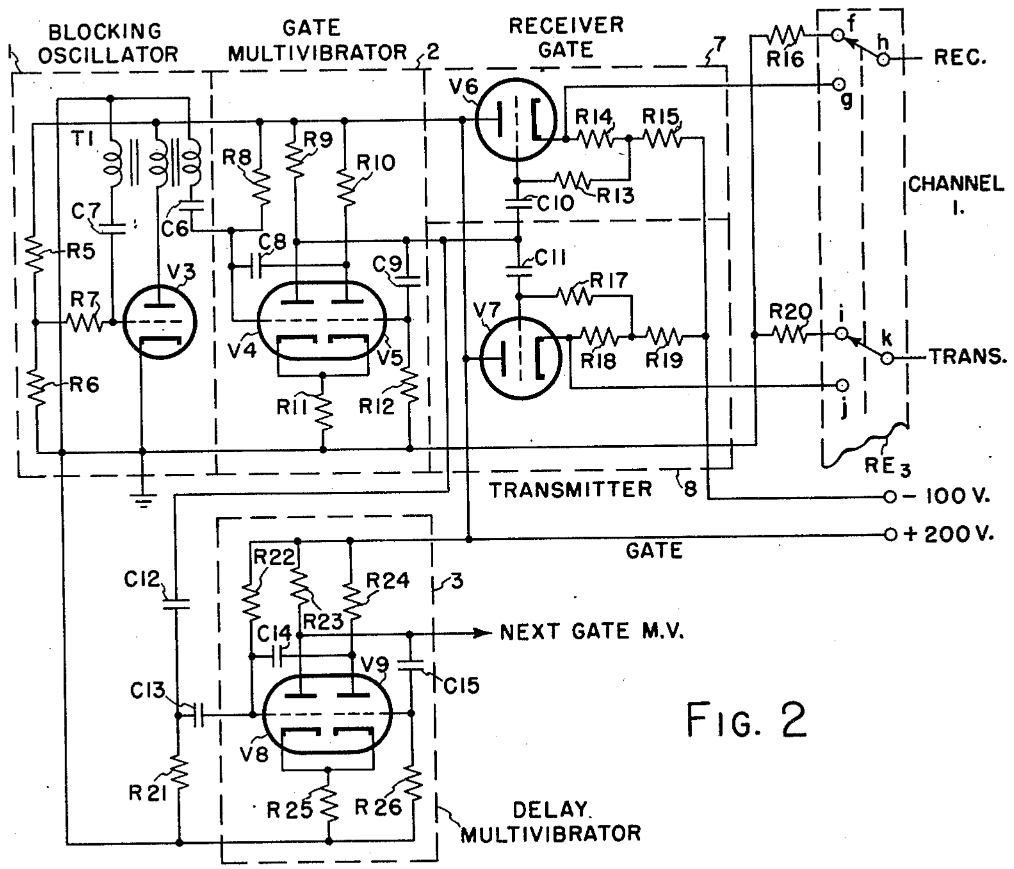
Figure 3:
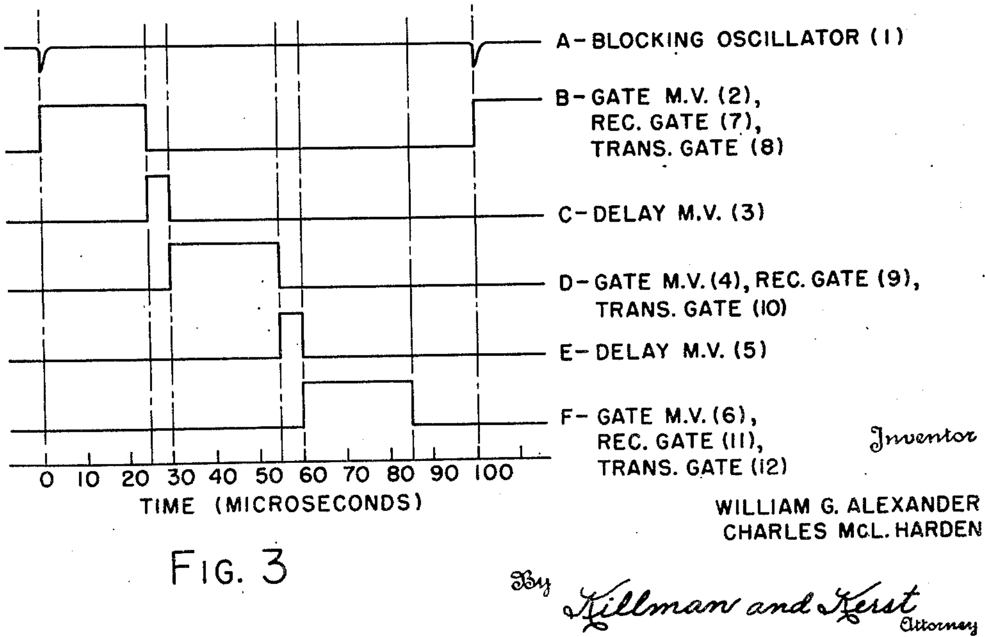
Figure 4:
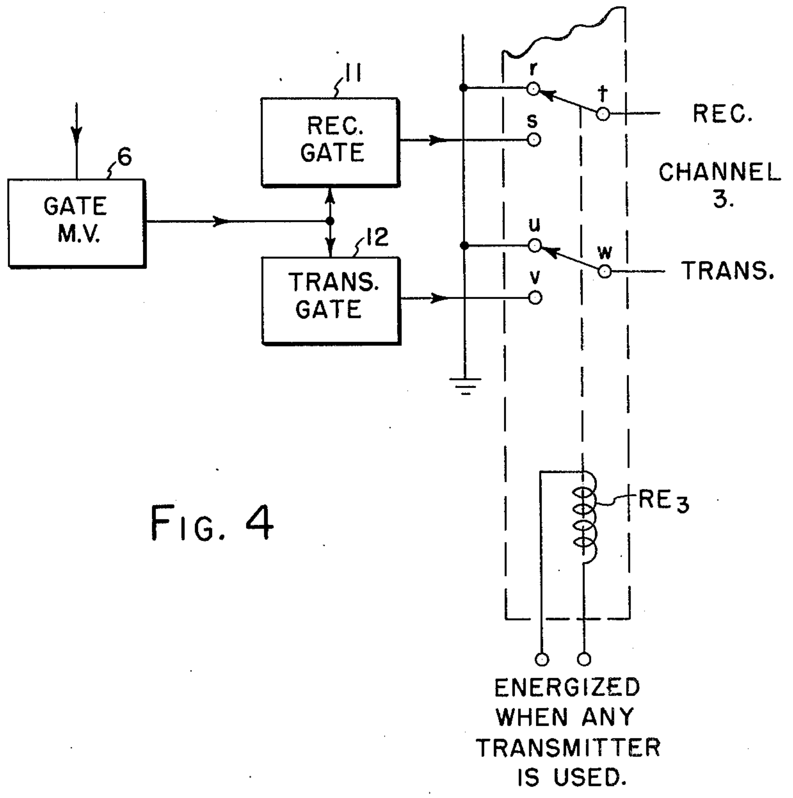

The invention may be better understood by reading the following description of the drawings:

Fig. 1 is a block diagram of an embodiment of the invention with a partial schematic of the control and indication circuits, Fig. 2 is a schematic of this embodiment of the invention with reference to one communication channel, Fig. 3 is a set of curves depicting the waveforms found in various parts of this time sharing unit, and Fig. 4 is a block diagram with a partial schematic showing of a simplified embodiment of the invention.

With reference to Fig. 1, a blocking oscillator 1 triggers a chain of one-kick multivibrators, 2 to 6 inclusive; 2, 4 and 6 being gate multivibrators for channels 1, 2 and 3 respectively; multivibrators 3 and 5 are for delay purposes only to insure that one channel is completely off before the next one starts. Receiver gate circuits 7, 9 and 11 take the gate pulses from multivibrators 2, 4 and 6 respectively and gate the receivers in their respective channels, a negative bias being applied to the first audio stage of said receivers to make them inoperative except for the duration of the gate pulse. Likewise transmitter gate circuits 8, 10 and 12 receive gate pulses from multivibrators 2, 4 and 6 respectively to gate the transmitters in their respective channels, said transmitters having a high value of negative bias applied to the grid of a low power radio frequency amplifier or mixer stage to make the transmitter inoperative except for the duration of the gate pulse. It will be noted that both the transmitter and receiver in each channel are gated simultaneously to permit the operator to use either without restriction as to whether operators on the other channels are transmitting or receiving.

The operation of Fig. 1 may be explained with references to the waveforms in Fig. 3. Blocking oscillator 1 has a sharp negative pulse output, as shown in curve A of Fig. B, with a recurrence rate of 100 microseconds, which triggers channel 1 gate multivibrator 2. This multivibrator has a positive output pulse of 25 microseconds duration as shown in Fig. 3–B. This pulse causes receiver gate circuit 7 and transmitter gate circuit 8 to key their respective equipments for the 25 microsecond duration of this pulse. As gate multivibrator 2 finishes its 25 microsecond pulse, delay multivibrator 3 is triggered and goes through its cycle of operation which lasts for 5 microseconds as indicated in curve C to insure that channel 1 is completely off before channel 2 starts. At the end of this 5 microsecond delay the gate multivibrator 4 is triggered, performing the same operations previously described, but for channel 2. Its output is shown by curve D. Delay multivibrator 5 and gate multivibrator 6 follow in sequence to operate channel 3, their outputs being shown by curves E and F respectively.

The fail-safe control circuit of the time sharing unit consists of a vacuum tube $V_1$, a first relay, $RE_1$, with contacts *a* and *b*, and a second relay $RE_3$, with contacts *f* to *v* inclusive, the coil of said second relay being connected in the plate circuit of said vacuum tube. The relay $RE_1$ is energized when any transmitter is operated, connecting terminals *a* and *b*. The output pulse from the last gate multivibrator 6 is applied through $C_1$ and relay contacts *a* and *b*, to the grid of $V_1$ keying the plate current for a period of 25 microseconds out of each 100 microseconds for the specific embodiment of the invention described here. Resistance $R_2$ is a grid return resistor for $V_1$. Resistor $R_3$ is a bias resistor for $V_1$ which reduces the plate current below the drop-out value for relay $RE_3$ when $RE_1$ is not energized, but when $RE_1$ is energized by the operation of any transmitter, $V_1$ will conduct at a pulsating rate enough current to energize $RE_3$ and put the communication system in a time sharing state. Condenser $C_2$ carries the alternating current around $R_3$ and stores sufficient charge to maintain bias on $V_1$ between pulses from the gate multivibrator. Condenser $C_5$ carries the alternating current around the coil of $RE_3$ to prevent excessive hysteresis and eddy current losses in the core of the relay in the form of heat. When $RE_3$ is not energized the system is on full time operation, but when energized the system is placed on a time sharing basis. It will be noted that the system will not be on a time sharing basis even when one or more channels are transmitting, except when the last multivibrator regularly supplies a gate pulse to the control tube $V_1$. This is a safety feature to insure operation of the communication system even though the time sharing unit should fail.

A visual indicator in the form of two pilot lights $I_1$ and $I_2$ may be provided to indicate whether or not the commutating system is operating correctly. The indicator tube $V_2$, functions in a manner similar to that previously described for $V_1$. It will be noted that the grid of $V_2$ is permanently attached through $C_1$ to the output circuit of the last gate multivibrator 6. The time constant of the condenser $C_1$ and resistor $R_1$ is such that as long as the commutating system functions properly, relay $RE_2$ will be energized and the green indicator lamp $I_2$ will indicate proper operation. Should the commutator fail $RE_2$ will not be energized, the red indicator lamp $I_1$ will indicate failure of the commutator and the communication system cannot be placed on time sharing.

Fig. 2 is a schematic drawing of the blocking oscillator and the circuits associated with the first channel of the communication system. The blocking oscillator 1 is a type well known in the prior art. Vacuum tube $V_3$ is coupled regeneratively through the plate winding of transformer $T_1$ back to its grid through the grid winding and $C_7$. The time constant of $C_7$ and $R_7$ is large compared to the time of the oscillation if the oscillator were free running. The resistor $R_7$ is returned to the junction of $R_5$ and $R_6$ which is positive with respect to the cathode. Assuming $V_3$ is just beginning to conduct, its grid is made positive by the regenerative feedback through $T_1$, causing a large plate current to flow and the grid to be highly positive. This process is cumulative to plate current saturation of $V_3$, at which time the collapsing magnetic field of the transformer causes the grid to swing negative to plate current cut-off. Enough current will have been drawn by the grid of the tube to charge $C_7$ to a high value of negative voltage, which is exponentially discharged through $R_7$. A period of 100 microseconds will elapse before enough charge has leaked off $C_7$ so that $V_3$ may be conductive again. The third winding on $T_3$ takes the sharp pulse output when $V_3$ is conducting and through $C_6$ triggers gate multivibrator 2.

The gate multivibrator comprising vacuum tubes $V_4$ and $V_5$ and associated components, is a conventional, one-shot mutivibrator which goes through one cycle of operation when triggered and returns to a stable condition of operation. The operation of the gate multivibrator is as follows. Before the trigger pulse from the blocking oscillator arrives, tube $V_4$ is highly conductive because of its grid being returned to B+ through resistor $R_8$. This plate current of $V_4$ keeps $V_5$ cut-off because of the ground return of the grid of $V_5$ and the voltage developed across the cathode resistor $R_{11}$ which is common to both tubes. When a negative pulse arrives at the gird of $V_4$ from the blocking oscillator, the decrease in the plate current of $V_4$ lets the bias voltage for $V_5$ which is developed across $R_{11}$ fall to a point where $V_5$ begins to conduct. The plate current of $V_5$ flowing through $R_{10}$ causes the plate voltage of $V_5$ to decrease from B+ where it had been previously. This voltage change is applied to the grid of $V_4$ through $C_8$ causing $V_4$ to conduct less and less current and its plate voltage to rise toward B+. This positive voltage is applied to the grid of $V_5$ through $C_9$. The process is cumulative until $V_5$ is conducting and $V_4$ is cut-off completely. The plate of $V_4$ remains at B+ until the charge on $C_9$ decays to a value where $V_5$ becomes less conductive and $V_4$ begins to conduct again. This constitutes the 25 microsecond gate pulse which is fed to the grids of $V_6$ and $V_7$, which are the gate tubes for the receiver and transmitter respectively. The principal time control elements are $C_9$, $R_9$ and $R_{12}$, although $C_8$, $R_8$, $R_{10}$ and $R_{11}$ have a minor influence. $R_{16}$ and $R_{20}$ are self-biasing resistors for the control grids of the first audio stage of the receiver and a low power radio frequency amplifier or mixer stage of the transmitter of channel 1.

The gate tubes are of the cathode follower variety with their cathodes returned to 100 volts negative. Before gating, the receiver has 45 volts negative applied to its first audio grid from the cathode of $V_6$, and the transmitter mixer grid has 70 volts negative applied. The gate pulse brings these two grids to zero voltage with respect to ground during the gate pulse.

The collapsing gate pulse from channel 1 is fed through a differentiating network composed of $C_{12}$, $C_{13}$ and $R_{21}$ to the grid of $V_8$, firing the delay multivibrator 3. The delay circuit comprising vacuum tubes $V_8$ and $V_9$ and associated components is of the same form as the gate circuit described above and its operation is identical. The only difference is that the timing circuit constants are designed to give 5 microsecond operation instead of 25 microseconds, as in the case of the gate circuit. The 5 microsecond delay pulse, as it decays is fed through another differentiating circuit, not shown, to fire the next gate generator.

This process of the decay of one multivibrator firing the next continues until the last multivibrator drives the control and indicator tubes. The blocking oscillator has a recurrence rate a little longer than the sum of the times of the individual multivibrators in the commutator chain.

Fig. 4 shows a simplified embodiment of the invention. The fail-safe control circuit and visual indicator circuit have been replaced by direct acting relay $RE_3$, which is energized when any transmitter is used, thereby placing the communication systems on a time sharing basis while the transmitter is in operation, and returning to full-time operation of the receivers when no transmitter is in operation.

It should be remembered that this invention relates to a central radio communication station consisting of a plurality of communication channels which are on a time sharing basis, the operators on said channels being in communication with single, isolated stations involving only one communication channel which is not on time sharing. This invention does not include the problems of synchronizing two or more isolated stations both of which are on time sharing.

What is claimed is:

1. In a radio communication station comprising a plurality of communication channels, each of said channels comprising a radio transmitter and a radio receiver tuned to a common frequency; the combination with said channels of means for sequentially keying said channels at a rate higher than the highest audio frequency translated by said channels, said means comprising means actuated upon the operation of any of said transmitters to bias all of said channels to cut-off, a blocking oscillator, a chain of single pulse generating circuits, one of said circuits being connected to be triggered by the output of said blocking oscillator, the remaining circuits of said chain being sequentially triggered, each by the termination of the pulse generated by the next preceding circuit of said chain, the time constants of said blocking oscillator being such that the interval between the pulses of its output is slightly longer than the sum of the durations of the pulses produced by said chain, and means applying the pulse output of a respective one of the circuits of said chain to the transmitter and receiver of each of said channels to overcome the bias thereof and render the same conductive for the duration of said pulse output.

2. The combination of claim 1, including means operable to disconnect said keying means from the transmitters and receivers of said channels upon the failure of said chain of pulse generating circuits to operate, said means comprising a relay means operative when energized to complete a connection between said keying means and said transmitters and receivers, and means for maintaining the energization of said relay means, the last named means comprising a time constant circuit storing energy from the output of one of said pulse generating circuits.

3. A radio communication station having a plurality of communication channels, each of said channels comprising a radio transmitter and a radio receiver tuned to a common frequency, means for sequentially keying said channels in rotation at a frequency higher than the highest audio frequency translated by said channels, said means comprising a source of voltage, means responsive to said source to generate a recurring sequence of voltage pulses of equal duration, and means responsive to the operation of any of said transmitters to bias each of said transmitters and receivers to a non-conductive state and to apply a respective one of the pulses of said sequence to each of said channels, said pulses being of sufficient amplitude to overcome said bias and render said transmitter and receiver conductive for the duration thereof.

WILLIAM G. ALEXANDER.
CHARLES McL. HARDEN.

References Cited in the file of this patent

UNITED STATES PATENTS

| Number | Name | Date |
|---|---|---|
| 1,951,524 | Nicolson | Mar. 20, 1934 |
| 2,080,081 | Loth et al. | May 11, 1937 |
| 2,199,634 | Koch | May 7, 1940 |
| 2,363,062 | Hartley | Nov. 21, 1944 |
| 2,402,916 | Schroeder | June 25, 1946 |
| 2,478,409 | Loughlin | Aug. 9, 1949 |
| 2,485,886 | Johnstone et al. | Oct. 25, 1949 |
| 2,510,987 | Levy | June 13, 1950 |
| 2,572,235 | Young, Jr. | Oct. 23, 1951 |